US012523181B2

(12) United States Patent
Immordino et al.

(10) Patent No.: US 12,523,181 B2
(45) Date of Patent: Jan. 13, 2026

(54) DEVICE FOR BLOCKING THE SHUT-OFF OF A PROPULSION ENGINE FOR AIRCRAFT

(71) Applicant: Airbus Operations SAS, Toulouse (FR)

(72) Inventors: Thierry Immordino, Toulouse (FR); Guillaume Alix, Toulouse (FR); David Boyer, Toulouse (FR); Gilian Antonio, Toulouse (FR); Bilal Guenchi, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 188 days.

(21) Appl. No.: 18/423,639

(22) Filed: Jan. 26, 2024

(65) Prior Publication Data

US 2024/0254929 A1 Aug. 1, 2024

(30) Foreign Application Priority Data

Jan. 30, 2023 (FR) ...................................... 2300837

(51) Int. Cl.
*F02C 9/46* (2006.01)
*F02C 9/28* (2006.01)

(52) U.S. Cl.
CPC .................. *F02C 9/46* (2013.01); *F02C 9/28* (2013.01); *F05D 2220/323* (2013.01); *F05D 2270/094* (2013.01); *F05D 2270/095* (2013.01)

(58) Field of Classification Search
None
See application file for complete search history.

(56) References Cited

U.S. PATENT DOCUMENTS

| 7,856,295 | B2 * | 12/2010 | Zaccaria | F02C 9/285 244/81 |
| 9,799,151 | B2 * | 10/2017 | Olson | G07C 5/0808 |
| 11,486,318 | B2 * | 11/2022 | Zaccaria | F01D 21/00 |
| 2009/0240386 | A1 | 9/2009 | Zaccaria et al. | |

(Continued)

FOREIGN PATENT DOCUMENTS

| EP | 1827978 B1 | 11/2008 |
| EP | 3909860 B | 7/2022 |

OTHER PUBLICATIONS

French Search Report for corresponding French Patent Application No. 2300837 dated Jul. 31, 2023.

*Primary Examiner* — Peter D Nolan
*Assistant Examiner* — Jacob Kent Besteman-Street
(74) *Attorney, Agent, or Firm* — Greer, Burns & Crain, Ltd.

(57) ABSTRACT

A blocking device for preventing an inappropriate shut-off of an engine of an aircraft. The blocking device enables by default the actuation of the shut-off unit and receives information representative of an activated or inactivated state of a fuel shut-off lever, of a reduced or non-reduced speed state of a throttle lever, and a correct or incorrect operating state of the engine. The blocking device blocks the actuation of the shut-off unit when the throttle lever is in an inactivated state, when the engine is in a correct operating state, and when, in addition, the throttle lever is in a non-reduced speed state or the throttle lever is in a reduced speed state and, in addition, the opposite propulsion engine is in a failed state or in an incorrect operating state.

8 Claims, 3 Drawing Sheets

(56) References Cited

U.S. PATENT DOCUMENTS

2016/0318620 A1 11/2016 Olson
2020/0340409 A1* 10/2020 Nguyen .................. F02C 9/28
2021/0404393 A1 12/2021 Zaccaria et al.

* cited by examiner

DEVICE FOR BLOCKING THE SHUT-OFF OF A PROPULSION ENGINE FOR AIRCRAFT

CROSS-REFERENCES TO RELATED APPLICATIONS

This application claims the benefit of French Patent Application Number 2300837 filed on Jan. 30, 2023, the entire disclosure of which is incorporated herein by way of reference.

FIELD OF THE INVENTION

The present invention relates to the blocking of the shut-off of a propulsion engine in an aircraft. Accordingly, the present invention relates to a device for preventing the stopping of the propulsion engine, and to a method implemented by such a device.

BACKGROUND OF THE INVENTION

In many aircraft, the pilots may command the shut-off of an engine used for propelling the aircraft, by actuating a dedicated controller in the cockpit. For example, this controller may be incorporated in an engine master lever (EML) used for controlling the engine. When it is actuated, this controller triggers the supply of power to a shut-off unit for shutting off the fuel supply to the engine, for example a fuel shut-off solenoid valve. The fuel supply to the engine is then stopped, resulting in the shut-off of the engine.

It is desirable to augment safety mechanisms in the field of aeronautics, and notably to provide a solution for preventing the shut-off of the engine if the controller is actuated in error, or if the emergency procedures are not followed, without blocking an effective engine shut-off if this is necessary for the safety of the aircraft, in the presence of fire for example.

SUMMARY OF THE INVENTION

An object of the present invention is to propose a blocking device for preventing an inappropriate shut-off of a propulsion engine of an aircraft. The shut-off is executed by a shut-off unit selectively actuated by a controller under the selective control of a pilot of the aircraft. The aircraft comprises another propulsion engine, called the opposite propulsion engine. The blocking device comprises a control unit in the form of electronic circuitry configured for enabling by default a possible actuation of the shut-off unit by the controller, and for:
  receiving information representative of an activated or inactivated state of a fuel shut-off lever of the propulsion engine, information representative of a reduced or non-reduced speed state of a control of the propulsion engine, information representative of a correct or incorrect operating state of the propulsion engine, information representative of an on, shut down or failed state of the opposite propulsion engine, and information representative of a correct or incorrect operating state of the opposite propulsion engine;
  blocking any actuation of the shut-off unit by the controller, if the fuel shut-off lever of the propulsion engine is in an inactivated state, if, in addition, the propulsion engine is in a correct operating state, and if, in addition, the propulsion engine control is in a non-reduced speed state; and blocking any actuation of the shut-off unit by the controller, if the fuel shut-off lever of the propulsion engine is in an inactivated state; if, in addition, the propulsion engine is in a correct operating state; if, in addition, the propulsion engine control is in a reduced speed state; and if, in addition, the opposite propulsion engine is in a failed state or the opposite propulsion engine is in an incorrect operating state.

Thus, it is possible to block a shut-off (i.e., prevent the stopping) of the propulsion engine in the event of inappropriate actuation of the shut-off unit by the controller, caused for example by erroneous operation of the controller by the pilot of the aircraft, or by a failure to comply with emergency procedures, while ensuring that the engine is effectively shut off when necessary.

According to a particular embodiment, the electronic circuitry is also configured for receiving information representative of a speed of the aircraft and/or information representative of an altitude of the aircraft, and for blocking any actuation of the shut-off unit by the controller when, in addition, the speed of the aircraft is greater than or equal to a predefined speed threshold, and/or the altitude of the aircraft is greater than or equal to a predefined altitude threshold.

According to a particular embodiment, the shut-off unit causes the propulsion engine to be shut off when said shut-off unit is supplied with power by the actuation of the controller. The blocking device comprises a switch placed on a power supply link to the shut-off unit from the controller, such that any supply of power to the shut-off unit by the controller is blocked when the switch is in the open position. The switch is in a closed position by default, and the control unit is configured for blocking a possible actuation of the shut-off unit by the controller by moving the switch to the open position.

The invention also relates to a shut-off system for selectively allowing a shut-off of an aircraft propulsion engine, comprising the blocking device in any of its embodiments and comprising the shut-off unit.

The invention also relates to an aircraft comprising at least one propulsion engine and, for each propulsion engine of the aircraft, the blocking device in any of its embodiments.

According to a particular embodiment, the controller is an engine master lever, and the shut-off unit is a high-pressure shut-off solenoid valve, or a low-pressure shut-off solenoid valve located upstream of the high-pressure shut-off solenoid valve in a fuel supply circuit of the propulsion engine.

The invention also relates to a method for preventing an inappropriate shut-off of a propulsion engine of an aircraft. The shut-off is executed by a shut-off unit selectively actuated by a controller under the selective control of a pilot of the aircraft. The aircraft comprises another propulsion engine, called the opposite propulsion engine. The method is implemented by a blocking device, comprises the default enabling of a possible actuation of the shut-off unit by the controller, and comprises steps of:
  receiving information representative of an activated or inactivated state of a fuel shut-off lever of the propulsion engine, information representative of a reduced or non-reduced speed state of a control of the propulsion engine, information representative of a correct or incorrect operating state of the propulsion engine, information representative of an on, shutdown or failed state of the opposite propulsion engine, and information representative of a correct or incorrect operating state of the opposite propulsion engine;

blocking any actuation of the shut-off unit by the controller, if the fuel shut-off lever of the propulsion engine is in an inactivated state, if, in addition, the propulsion engine is in a correct operating state, and if, in addition, the propulsion engine control is in a non-reduced speed state; and blocking any actuation of the shut-off unit by the controller, if the fuel shut-off lever of the propulsion engine is in an inactivated state; if, in addition, the propulsion engine is in a correct operating state; if, in addition, the propulsion engine control is in a reduced speed state; and if, in addition, the opposite propulsion engine is in a failed state or the opposite propulsion engine is in an incorrect operating state.

Also proposed is a computer program product which may be stored on a storage medium and/or downloaded from a communication network so as to be read by a processor. This computer program comprises instructions for implementing the aforementioned method in any of its embodiments when said computer program is executed by the processor. The invention also relates to a data storage medium storing such a computer program comprising instructions for implementing the aforementioned method in any of its embodiments when said computer program is read from said storage medium and executed by the processor.

BRIEF DESCRIPTION OF THE DRAWINGS

The aforementioned characteristics of the invention, along with others, will become more clearly apparent on reading the following description of at least one example of embodiment, said description being given with reference to the appended drawings, in which.

DETAILED DESCRIPTION OF THE PREFERRED EMBODIMENTS

Figure 1:
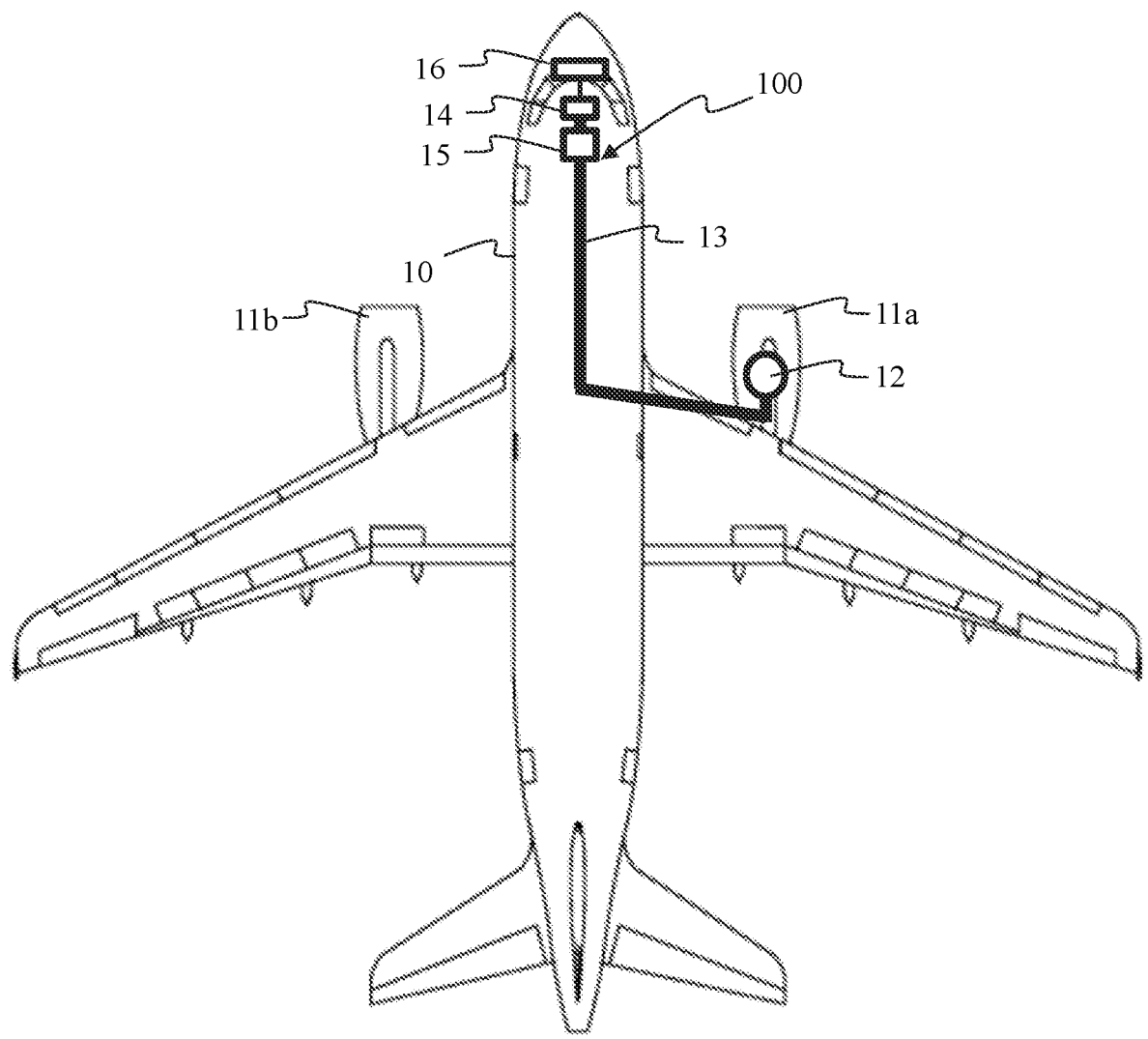
FIG. 1 shows schematically, in a top view, an aircraft equipped with at least one propulsion engine and a blocking device for each propulsion engine of said aircraft.

Thus FIG. 1 shows schematically, in a top view, an aircraft 10. The aircraft 10 comprises two propulsion engines 11a, 11b on either side of the fuselage, for example a turbojet mounted under each wing of the aircraft 10. The aircraft 10 comprises a cockpit in which at least one pilot is to be seated to operate the aircraft 10. The aircraft 10 further comprises an avionics system 16 for ensuring the correct operation of the aircraft 10, for providing assistance in flying and for transmitting data from sensors of the propulsion engines 11a, 11b to on-board instruments located in the cockpit.

The aircraft 10 comprises an engine control system 100 for each propulsion engine 11a, 11b. Thus each propulsion engine 11a, 11b has one engine control system 100 associated with it. For the sake of simplicity, only the control system 100 of the propulsion engine 11a is shown in FIG. 1 and described in the remainder of the description, the other propulsion engine 11b being referred to as the opposite propulsion engine 11b. However, the aircraft 10 comprises a similar engine control system 100 associated with a propulsion engine 11b.

The engine control system 100 comprises a controller 14 for shutting off the engine, located in the cockpit, and intended to enable a pilot of the aircraft 10 to selectively command the shut-off of the propulsion engine 11a. The controller 14 is, for example, an engine master lever (EML).

The engine control system 100 further comprises a shut-off unit 12, for selectively enabling the shut-off of the propulsion engine 11a. The shut-off unit 12 is actuated selectively by the controller 14. In other words, when a pilot of the aircraft 10 actuates the controller 14 to command the shut-off of the propulsion engine 11a, the controller 14 then actuates the shut-off unit 12.

In a particular embodiment, the shut-off unit 12 is intended to selectively enable the fuel supply to the propulsion engine 11a to be stopped. The shut-off unit 12 is then connected to the controller 14 by a power connector 13, and when the shut-off unit 12 is switched on by the actuation of the controller 14, the fuel supply to the propulsion engine 11a is stopped, causing the engine to be shut off.

The shut-off unit 12 is preferably installed near the propulsion engine 11a, and, in a particular embodiment, is a high-pressure shut-off solenoid valve (HPSOV). The shut-off unit 12 may also be a low-pressure shut-off solenoid valve (LPSOV), located upstream of the high-pressure shut-off solenoid valve (HPSOV) in a fuel supply circuit of the propulsion engine 11a.

The engine control system 100 further comprises a blocking device 15. The blocking device 15 comprises blocking means for blocking a possible actuation of the shut-off unit 12 by the controller 14.

Figure 2:
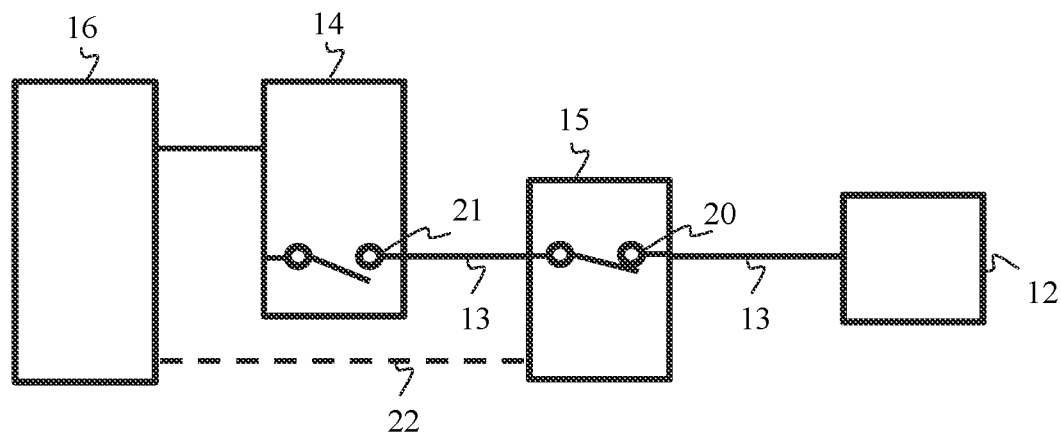
FIG. 2 shows schematically a hardware arrangement of an assembly formed by the blocking device, a controller and a shut-off unit.

In a particular embodiment, the blocking means comprise a switch, such as the switch 20 described in FIG. 2, placed on a power connector of the shut-off unit 12 such as the power connector 13. The power supply to the shut-off unit 12 then passes through the blocking device 15, and the movement of said switch to the open position prevents the shut-off unit 12 from being supplied with power, thus blocking any actuation of the shut-off unit 12 by the controller 14.

In a variant, the blocking means comprise a solenoid valve which, when actuated, causes the fuel to by-pass the shut-off unit 12, thereby preventing the stopping of the fuel supply to the propulsion engine 11a in the event that the shut-off unit is actuated.

Using a control unit, the blocking device 15 monitors parameters and determines whether the actuation of the shut-off unit 12 by the controller 14 for shutting off the engine should or should not be blocked.

The parameters monitored by the blocking device 15 may comprise flight parameters such as speed and/or altitude, making it possible to determine whether or not the aircraft 10 is within the conditions of an envelope of protection where the blocking of the engine shut-off is enabled. The advantage of providing such an envelope of protection is that it allows the engine to be shut off when this presents no danger to the safety of the aircraft, for example when the aircraft is stationary on the ground, and that it allows the engine to be shut off in flight in emergency landing or ditching situations.

The monitored parameters may also comprise a parameter representative of an emergency situation relating to the propulsion engine 11a, such as a risk of fire in the propulsion engine 11a. If an emergency situation is detected in the propulsion engine 11a, the actuation of the shut-off unit 12 must not be blocked. The parameter representative of an emergency situation may be an activated or inactivated state of a fuel shut-off lever of the propulsion engine 11a. When it is activated, the fuel shut-off lever isolates the propulsion engine 11a from all sources, such as electricity, oil or fuel, that may support a fire. Thus an inactive state indicates that no procedure for extinguishing an engine fire is being executed in the propulsion engine 11a.

The monitored parameters may also comprise a state, which may or may not be a reduced speed state, of a control of the propulsion engine 11a, such as a throttle lever of the propulsion engine 11a. The monitored parameters may further comprise a correct or incorrect operating state of the propulsion engine 11a.

The monitored parameters may further comprise an "on", "shut down" or "failed" state of the opposite propulsion engine 11b, together with a correct or incorrect operating state of the opposite propulsion engine 11b. The on, shut down or failed state of the opposite propulsion engine 11b is determined with the aid of two data elements relating, on the one hand, to a control parameter of the opposite propulsion engine 11b (such as a position of the controller 14 of said opposite propulsion engine 11b), and, on the other hand, to a plurality of operating parameters of the opposite propulsion engine 11b. If the control parameter indicates an engine that is on or shut down, respectively, and the plurality of operating parameters also indicates that the engine is actually on or actually shut down, respectively, then the opposite propulsion engine 11b is in an on or shut down state, respectively. Conversely, if the control parameter indicates an engine that is on, but the plurality of operating parameters also indicates that the engine is actually shut down, then the opposite propulsion engine 11b is in a failed state.

According to one embodiment, when the aircraft 10 is in the envelope of protection and the opposite propulsion engine 11b is in a failed state or in an incorrect operating state, the actuation of the shut-off unit 12 of the propulsion engine 11a is blocked in order to prevent both propulsion engines 11a and 11b from being simultaneously unusable without the pilot's being aware of this.

FIG. 2 shows schematically an example of a hardware arrangement of an assembly formed by the blocking device 15, the controller 14 and the shut-off unit 12, in a particular embodiment.

The controller 14 comprises at least one switch 21, located on the power connector 13. Said switch 21 is in an open position by default. When the pilot actuates the controller 14 to command a shut-off of the engine, said switch 21 moves from an open position to a closed position, thus enabling the shut-off unit 12 to be supplied with power. The controller 14 may also comprise one or more other switches connected to other members of the aircraft 10, making it possible, for example, to inform the avionics system 16 of an engine shut-off when they change their position.

In the particular embodiment of FIG. 2, the blocking device 15, placed between the controller 14 and the shut-off unit 12, comprises a switch 20, such as an electromechanical relay, located on the power connector 13 of the shut-off unit 12. The power supply to the shut-off unit 12 therefore passes through the switch 20.

The switch 20 of the blocking device 15 remains in the closed position as long as the aircraft is in the envelope of protection. As long as the position of the switch 20 of the blocking device 15 is kept closed, an actuation of the shut-off unit 12 by the controller 14, and the resulting movement of the switch 21 to a closed position, then causes power to be supplied to the shut-off unit 12 by the power connector 13 and therefore causes the propulsion engine 11a to be stopped. The stopping of the propulsion engine 11a is thus ensures in operating conditions or safety conditions that require it.

In the particular embodiment of FIG. 2, the blocking device 15, by means of its control unit, monitors parameters and determines whether or not the switch 20 of the blocking device 15 should be open. When the monitored parameters meet predefined criteria, the control unit of the blocking device 15 moves the switch 20 to the open position, thus preventing the shut-off unit 12 from being supplied with power, even if the shut-off unit 12 is actuated by the controller 14 and the switch 21 of the controller 14 is in the closed position. The stopping of the propulsion engine 11a is thus prevented by the blocking of the actuation of the shut-off unit 12.

The monitoring of the parameters by the control unit 150 of the blocking device 15 is carried out with the aid of data, from the avionics system 16 for example, received via a communication link 22. The blocking device 15 may also, or alternatively, receive data from other elements of the aircraft 10, such as sensors or actuators of the propulsion engine 11a, sensors or actuators of the opposite propulsion engine 11b, or instruments on board the aircraft.

Figure 3:
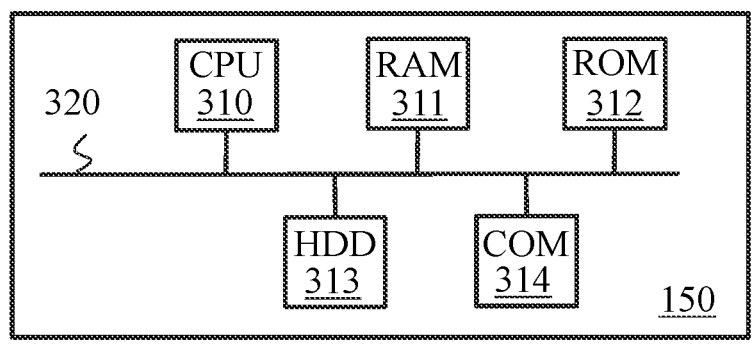
FIG. 3 shows schematically an example of the hardware architecture of a control unit of the blocking device.

FIG. 3 shows schematically an example of the hardware architecture of a control unit 150 of the blocking device 15. The control unit 150 then comprises the following, linked by an internal communication bus 320: a processor or CPU (Central Processing Unit) 310; a random access memory (RAM) 311; a read-only memory (ROM) 312; a storage medium or a reader of a storage medium, such as a hard disk drive (HDD) 313; and an interface 314 for communicating with the avionics system 16 and/or sensors of the propulsion engine 11a, sensors of the opposite propulsion engine 11b or instruments on board the aircraft 10.

The processor 310 is capable of executing instructions loaded into the RAM 311 from the ROM 312, from an external memory (not shown), from a storage medium, or from a communication network. When the control unit 150 is switched on, the processor 310 can read instructions from the RAM 211 and execute them. These instructions form a computer program that causes the implementation, by the processor 310, of some or all of the algorithms and steps described below in relation to the blocking device 15.

Accordingly, some or all of the algorithms and steps described hereafter in relation to the blocking device 15 may be implemented in software form by the execution of a set of instructions by a programmable machine such as a DSP (Digital Signal Processor) or a microcontroller, or may be implemented in hardware form by a dedicated machine or component such as an FPGA (Field-Programmable Gate Array) or an ASIC (Application-Specific Integrated Circuit).

Figure 4:
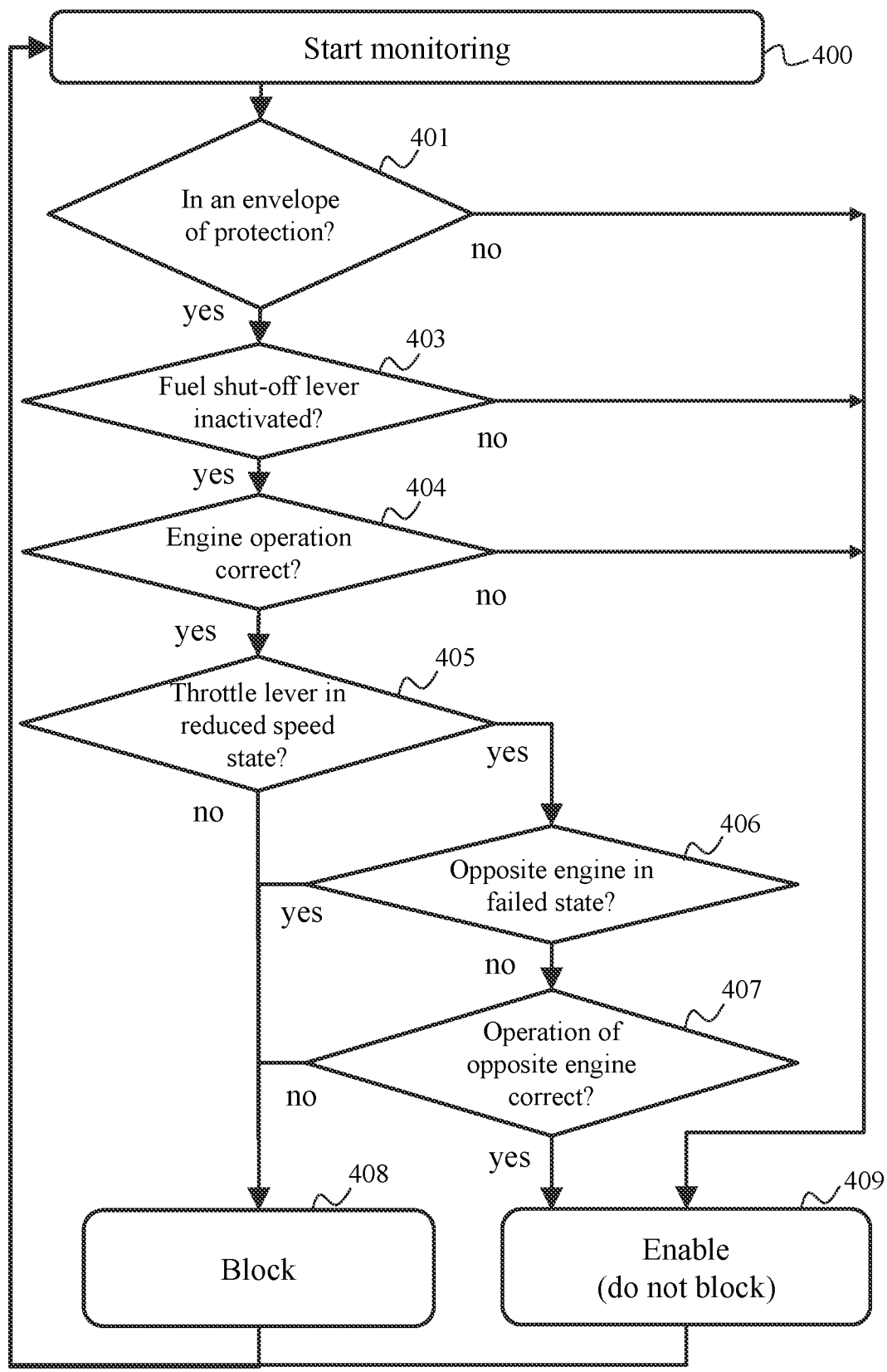
FIG. 4 shows schematically an algorithm for blocking an engine shut-off, implemented by the blocking device.

FIG. 4 shows schematically an algorithm for blocking an engine shut-off, implemented by the blocking device 15.

In a step 400, the blocking device 15 starts to monitor the parameters. The blocking device 15 receives data, from the avionics system 16 for example, representative of said parameters, in order to carry out the monitoring of said parameters. It should be noted that step 400, and the following steps, are executed solely when the propulsion engine 11a is on.

In a step 401, according to a particular embodiment, the blocking device 15 determines whether or not the aircraft 10 is in conditions of the aforementioned envelope of protection.

In a particular embodiment, the envelope of protection is defined by a minimum speed of the aircraft 10. Thus, the blocking device 15 compares the speed of the aircraft 10 with a predefined speed threshold S1, equal to 80 knots for example. If the speed of the aircraft 10 is greater than or equal to the predefined speed threshold S1, the blocking device 15 executes step 403. Otherwise, the blocking device 15 executes a step 409.

In a particular embodiment, the envelope of protection is defined by a minimum altitude of the aircraft 10. Thus, the blocking device 15 compares the altitude of the aircraft 10 with a predefined altitude threshold S2, equal to 200 feet for example. If the altitude of the aircraft 10 is greater than or equal to the predefined altitude threshold S2, the blocking device 15 executes step 403. Otherwise, the blocking device 15 executes step 409.

In a particular embodiment, the envelope of protection is defined by both a minimum speed of the aircraft 10 and a minimum altitude of the aircraft 10; that is to say, the conditions of the envelope of protection are fulfilled when the speed of the aircraft 10 is greater than or equal to the predefined speed threshold S1, and when, in addition, the altitude of the aircraft 10 is greater than or equal to the predefined altitude threshold S2.

In step 403, the blocking device 15 monitors a parameter representative of an emergency situation relating to the propulsion engine 11a, and determines whether or not an emergency situation is detected at the propulsion engine 11a. For this purpose, the blocking device 15 determines whether the fuel shut-off lever of the propulsion engine 11a is in an activated or inactivated state. If the fuel shut-off lever is in an inactivated state, step 404 is executed. Otherwise step 409 is executed. Thus, if an emergency situation is detected at the propulsion engine 11a, relating to a fire risk for example, the shut-off of the propulsion engine 11a is ensured.

In step 404, the blocking device 15 monitors a parameter representative of an operating state of the propulsion engine 11a and determines, on the basis of said parameter, whether the propulsion engine 11a is in a correct or incorrect operating state. If the propulsion engine 11a is in a correct operating state, step 405 is executed. Otherwise step 409 is executed. Thus, the shut-off of the propulsion engine 11a is ensured if the operation of the propulsion engine 11a is incorrect.

In step 405, the blocking device 15 monitors a control parameter of the propulsion engine 11a and determines whether or not a control of the propulsion engine 11a, such as the throttle lever of the propulsion engine 11a, is in a reduced speed state. The throttle lever is in a reduced speed state if its setting indicates a power setpoint of the propulsion engine 11a below a predefined power. If this is the case, step 406 is executed. Otherwise step 408 is executed. Thus, if the controller 14 is actuated in error by the pilot, for example owing to confusion about the lever to be actuated, or owing to an incorrect identification of the failed engine, the stopping of the propulsion engine 11a may be prevented.

In step 406, the blocking device 15 determines whether the opposite propulsion engine 11b is on or shut down or has failed. If the opposite engine 11b is on or shut down, step 407 is executed. If the opposite propulsion engine 11b has failed, step 408 is executed. Thus, when the opposite engine 11b has failed, the stopping of the propulsion engine 11a is prevented.

In step 407, the blocking device 15 determines whether the opposite propulsion engine 11b is in a correct operating state. If this is the case, step 409 is executed. Otherwise, that is to say if the opposite propulsion engine 11b is malfunctioning, step 408 is executed. Thus, if the opposite propulsion engine 11b is malfunctioning, the stopping of the propulsion engine 11a is prevented.

In step 408, the blocking device 15 blocks a possible actuation of the shut-off unit 12. For example, according to the particular embodiment described in FIG. 2, the blocking device 15 moves the switch 20 to the open position, preventing the supply of power to the shut-off unit 12 and thus preventing the stopping of the propulsion engine 11a, even if the shut-off unit 12 is actuated by the controller 14. Thus the stopping of the propulsion engine 11a can be prevented when the actuation of the shut-off unit 12 is accidental or inappropriate, or when emergency procedures have not been followed correctly.

Additionally, in a particular embodiment, the blocking device 15 sends a message to a display device visible to the pilot, indicating that the shut-off of the propulsion engine 11a is blocked, and that the propulsion engine 11a cannot be stopped by actuating the shut-off unit 12. Alternatively, the blocking device 15 sends a message only when the controller 14 is also actuated by the pilot.

In step 409, the blocking device 15 enables a possible actuation of the shut-off unit 12. For example, according to the particular embodiment described in FIG. 2, the blocking device 15 keeps the switch 20 in the closed position. Actuation of the shut-off unit 12 by the controller 14 then enables the shut-off unit 12 to be supplied with power, resulting in the shut-off of the propulsion engine 11a.

After the implementation of step 408, the blocking device 15 returns to step 400, possibly after a predefined wait time. Similarly, after the implementation of step 409, the blocking device 15 returns to step 400, possibly after a predefined wait time.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A blocking device for preventing an inappropriate shut-off of a propulsion engine of an aircraft, the shut-off being executed by a shut-off unit actuated selectively by a controller under selective control of a pilot of the aircraft, the aircraft comprising another propulsion engine, called an opposite propulsion engine, wherein the blocking device comprises:
   a control unit having electronic circuitry configured to:
      enable by default a possible actuation of the shut-off unit by the controller;
      receive information representative of an activated state or an inactivated state of a fuel shut-off lever of the propulsion engine, information representative of a reduced speed state or a non-reduced speed state of a control of the propulsion engine, information representative of a correct operating state or an incorrect operating state of the propulsion engine, information representative of an on state, a shut down state, or a failed state of the opposite propulsion engine, and information representative of a correct operating state or an incorrect operating state of the opposite propulsion engine;

block the possible actuation of the shut-off unit by the controller, when the fuel shut-off lever of the propulsion engine is in the inactivated state, when the propulsion engine is also in the correct operating state, and when, in addition, the control of the propulsion engine is in the non-reduced speed state; and block the possible actuation of the shut-off unit by the controller, when the fuel shut-off lever of the propulsion engine is in the inactivated state, when, in addition, the propulsion engine is in the correct operating state, when, in addition, the control of the propulsion engine is in the reduced speed state, and when, in addition, the opposite propulsion engine is in the failed state or the opposite propulsion engine is in the incorrect operating state.

2. The blocking device according to claim 1, wherein the electronic circuitry is further configured to:

receive information representative of a speed of the aircraft, or an altitude of the aircraft, or both; and block the possible actuation of the shut-off unit by the controller when, in addition, the speed of the aircraft is greater than or equal to a predefined speed threshold, or the altitude of the aircraft is greater than or equal to a predefined altitude threshold, or, when the speed of the aircraft is greater than or equal to a predefined speed threshold and the altitude of the aircraft is greater than or equal to a predefined altitude threshold.

3. The blocking device according to claim 1, wherein the shut-off unit causes a shut-off of the propulsion engine when said shut-off unit is supplied with power by the actuation of the controller, wherein the blocking device further comprises a switch located on a power connector running from the controller to the shut-off unit, so as to block the possible supply of power to the shut-off unit by the controller when the switch is in an open position, the switch being in a closed position by default, and the control unit being configured to block the possible actuation of the shut-off unit by the controller, by moving the switch to the open position.

4. A shut-off system for selectively allowing the shut-off of an aircraft propulsion engine, the shut-off system comprising:

the blocking device according to claim 1, and the shut-off unit.

5. An aircraft comprising:

at least one propulsion engine and, for each propulsion engine of the aircraft, the blocking device according to claim 1.

6. The aircraft according to claim 5, wherein the controller is an engine master lever, and wherein the shut-off unit is a high-pressure shut-off solenoid valve, or a low-pressure shut-off solenoid valve located upstream of a high-pressure shut-off solenoid valve in a fuel supply circuit of the at least one propulsion engine.

7. A method for preventing an inappropriate shut-off of a propulsion engine of an aircraft, the shut-off being executed by a shut-off unit actuated selectively by a controller under selective control of a pilot of the aircraft, the aircraft comprising another propulsion engine, called an opposite propulsion engine, the method being implemented by a blocking device, the method comprising:

enabling by default a possible actuation of the shut-off unit by the controller by:

receiving information representative of an activated state or an inactivated state of a fuel shut-off lever of the propulsion engine, information representative of a reduced speed state or a non-reduced speed state of a control of the propulsion engine, information representative of a correct operating state or an incorrect operating state of the propulsion engine, information representative of an on state, a shut down state, or a failed state of the opposite propulsion engine, and information representative of a correct operating state or an incorrect operating state of the opposite propulsion engine;

blocking the possible actuation of the shut-off unit by the controller, when the fuel shut-off lever of the propulsion engine is in the inactivated state, when the propulsion engine is also in the correct operating state, and when, in addition, the control of the propulsion engine is in the non-reduced speed state; and blocking the possible actuation of the shut-off unit by the controller, when the fuel shut-off lever of the propulsion engine is in the inactivated state, when, in addition, the propulsion engine is in the correct operating state, when, in addition, the control of the propulsion engine is in the reduced speed state, and when, in addition, the opposite propulsion engine is in the failed state or the opposite propulsion engine is in the incorrect operating state.

8. A non-transitory computer readable medium storing a computer program comprising instructions for implementing the method according to claim 7, when said computer program is executed by a processor.

* * * * *